M. G. HUBBARD.
Harvester Cutter.
No. 16,057.
Patented Nov. 11, 1856.
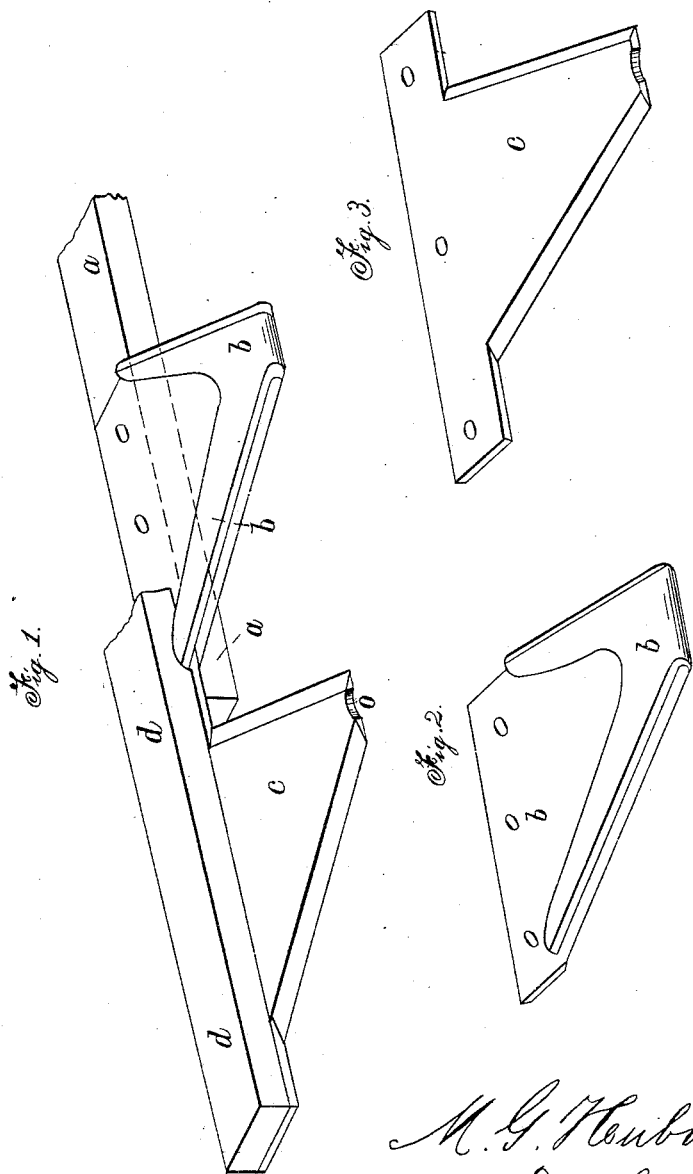

UNITED STATES PATENT OFFICE.

MOSES G. HUBBARD, OF PENN YAN, NEW YORK.

IMPROVEMENT IN THE CUTTING APPARATUS OF GRAIN AND GRASS HARVESTERS.

Specification forming part of Letters Patent No. 16,057, dated November 11, 1856.

*To all whom it may concern:*

Be it known that I, MOSES G. HUBBARD, of Penn Yan, county of Yates, and State of New York, have invented a new and useful Apparatus for Cutting Grass and Grain; and I do hereby declare the following to be a full, clear, and exact description thereof, reference being had to the accompanying drawings, in which—

Figure 1 is a general view; Figs. 2 and 3, separate cutters.

My improvement in the cutting apparatus of harvesters consists in the peculiar construction of a single and double cutter, and combining the same for operation so as to cause the single cutter to pass between the upper and lower halves of the double cutter, and thus the grass or grain, while being cut, is supported both above and below the edge of the single cutter by the double edge of the double cutter as effectually as it has heretofore been by the ordinary guard-finger while the ordinary single cutter is passing through it. By this means the edge of the single cutter is kept in close contact with the cutting-edge of the double cutter, and the possibility of these edges being separated by wear, so as to admit the grass between them to clog or bind the machinery, is effectually prevented, and thereby the necessity for using expensive sickles—such as have been required in the ordinary double-cutter machines—is avoided and the cheaper-constructed cutters are rendered practicable.

I am aware that many attempts have been made by Lamb, Danforth, and other earlier inventors to use a combination of two moving sickle-cutters working in opposite directions; but in every device of that kind that I have ever seen too much accuracy and perfection were required in fitting and making the parts in order to keep the sickles in close contact and prevent the grass from being bent by the upper sickle over the edge of the lower one and forced between them, by which the cutting-edges are separated so as to clog and bind, and thus prevent cutting and producing great resistance. The great perfection of construction such an apparatus required is found to be too expensive for practical use, as it has become necessary to construct this class of machinery at the lowest possible cost, and to make it durable under the severe wear to which it is subjected, and, however well the single cutters may fit when first set to work, they soon wear and become useless.

In fitting and constructing my combination of single and double cutters no great perfection is required in fitting the parts, while sufficient durability is insured by the broad surfaces of the single and double cutters wearing together, as it is evident that it would require a great amount of actual use to so wear them as to permit their cutting-edges to separate or spring apart sufficiently to allow grass to pass in between them, especially when supported above and below the cutting-point.

The necessary motions may be given to the parts by means of a double crank or double eccentric or any other mechanical device in ordinary use for that purpose.

The parts of my cutting apparatus are formed as follows: I attach to the upper side of a cutter-bar, *a*, a series of double cutters, *b*. These cutters (shown clearly in Figs. 1 and 2) are formed of a single piece of sheet-steel, and the upper part is bent over the under one, parallel thereto, with just sufficient space between them for the single cutter *c* to work in. The upper and lower parts of this double cutter, being joined at their forward end, form a shield for the single cutter *c*, which is seen detached at Fig. 3, and is a simple triangular cutter cut from a plain piece of plate-steel. The point *o* of the single cutter *c*, it will be observed, is cut out in a slightly-curved form, by means of which any fine-cut grass or any other obstruction which may get into the double cutter is worked out by the single cutter *c* while the two cutters are operating in opposite directions. These cutters *c* are affixed to the under side of a second or upper cutter-bar, *d*, (see Fig. 1,) that plays directly over the bar *a*. As both bars *a* and *d* vibrate the cutter *c* plays through the double cutter *b* and cuts the grass between them.

Having thus fully described my invention, what I claim therein as new, and for which I desire Letters Patent, is—

The combination of a single cutter with a double cutter, when both are constructed substantially in the manner described above and made to reciprocate in directions opposite to each other, substantially in the manner and for the purposes described.

M. G. HUBBARD.

In presence of—
WM. S. HASCALL,
R. F. ANDREWS.